(12) United States Patent
Anand et al.

(10) Patent No.: US 11,863,809 B2
(45) Date of Patent: *Jan. 2, 2024

(54) METHOD, SYSTEM, AND APPARATUS FOR PROGRAMMATICALLY GENERATING A CHANNEL INCREMENTALITY RATIO

(71) Applicant: Groupon, Inc., Chicago, IL (US)

(72) Inventors: Rahul Anand, Sunnyvale, CA (US); Sandeep Dey, Bellevue, WA (US); Ravi Kiran Garimella, Fremont, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,063

(22) Filed: Oct. 7, 2022

(65) Prior Publication Data

US 2023/0040038 A1 Feb. 9, 2023

Related U.S. Application Data

(63) Continuation of application No. 17/322,384, filed on May 17, 2021, now Pat. No. 11,496,785, which is a continuation of application No. 16/892,979, filed on Jun. 4, 2020, now Pat. No. 11,044,509, which is a continuation of application No. 16/228,547, filed on Dec. 20, 2018, now Pat. No. 10,715,855.

(60) Provisional application No. 62/608,381, filed on Dec. 20, 2017.

(51) Int. Cl.
| | |
|---|---|
| *H04N 21/266* | (2011.01) |
| *H04N 21/278* | (2011.01) |
| *H04N 21/262* | (2011.01) |
| *H04N 21/258* | (2011.01) |

(52) U.S. Cl.
CPC ..... *H04N 21/266* (2013.01); *H04N 21/25891* (2013.01); *H04N 21/26216* (2013.01); *H04N 21/278* (2013.01)

(58) Field of Classification Search
CPC .......... H04N 21/251; H04N 21/25435; H04N 21/25891; H04N 21/26216; H04N 21/266; H04N 21/2668; H04N 21/278; H04N 21/44222; H04N 21/6582
See application file for complete search history.

(56) References Cited

U.S. PATENT DOCUMENTS

| | | | | |
|---|---|---|---|---|
| 5,635,978 A * | 6/1997 | Alten | ..... | H04N 7/025 725/43 |
| 7,509,664 B2 * | 3/2009 | Hayashida | ..... | H04N 5/782 725/52 |
| 7,881,657 B2 * | 2/2011 | Wang | ..... | H04H 60/40 725/35 |
| 8,086,171 B2 * | 12/2011 | Wang | ..... | H04H 60/37 725/35 |
| 8,290,423 B2 * | 10/2012 | Wang | ..... | H04B 17/23 455/2.01 |
| 8,442,426 B2 * | 5/2013 | Wang | ..... | H04H 60/40 725/35 |
| 8,490,128 B2 * | 7/2013 | Davis | ..... | H04N 21/4334 725/62 |

(Continued)

*Primary Examiner* — Michael B. Pierorazio
(74) *Attorney, Agent, or Firm* — Alston & Bird LLP

(57) ABSTRACT

Embodiments of the present disclosure provide methods, systems, and apparatuses for computing a channel incrementality ratio using a machine learning model.

20 Claims, 4 Drawing Sheets

(56) References Cited

U.S. PATENT DOCUMENTS

| | | | | |
|---|---|---|---|---|
| 8,516,533 B2* | 8/2013 | Davis | H04N 5/775 | 725/12 |
| 8,528,036 B2* | 9/2013 | Davis | H04N 21/42203 | 725/62 |
| 8,571,864 B2* | 10/2013 | DeBusk | G06F 16/685 | 704/235 |
| 8,639,178 B2* | 1/2014 | Anniballi | H04H 60/43 | 455/3.01 |
| 8,686,271 B2* | 4/2014 | Wang | G10H 1/361 | 84/600 |
| 8,725,829 B2* | 5/2014 | Wang | G06Q 30/06 | 704/239 |
| 8,811,885 B2* | 8/2014 | Wang | H04H 60/44 | 455/2.01 |
| 2004/0055009 A1* | 3/2004 | Hayashida | H04N 21/47 | 725/39 |
| 2004/0143349 A1* | 7/2004 | Roberts | G06F 16/40 | 704/278 |
| 2004/0163110 A1* | 8/2004 | Won | H04N 21/435 | 725/50 |
| 2007/0124756 A1* | 5/2007 | Covell | G06F 16/635 | 348/E7.071 |
| 2007/0212019 A1* | 9/2007 | Kimura | H04N 21/84 | 386/291 |
| 2008/0049704 A1* | 2/2008 | Witteman | H04H 60/58 | 370/342 |
| 2008/0051029 A1* | 2/2008 | Witteman | H04L 65/611 | 455/17 |
| 2008/0066098 A1* | 3/2008 | Witteman | G06Q 30/02 | 725/35 |
| 2008/0082510 A1* | 4/2008 | Wang | H04H 60/40 | |
| 2010/0205628 A1* | 8/2010 | Davis | H04N 21/472 | 455/414.1 |
| 2011/0099197 A1* | 4/2011 | Wang | H04H 60/37 | 707/769 |
| 2011/0273455 A1* | 11/2011 | Powar | G11B 27/10 | 345/473 |
| 2011/0281566 A1* | 11/2011 | Davis | H04N 21/4622 | 455/414.1 |
| 2011/0283305 A1* | 11/2011 | Davis | H04N 21/4367 | 725/9 |
| 2011/0283306 A1* | 11/2011 | Davis | H04N 21/43637 | 725/9 |
| 2011/0283310 A1* | 11/2011 | Davis | H04N 21/23418 | 455/414.1 |
| 2011/0283319 A1* | 11/2011 | Davis | H04N 21/2665 | 725/39 |
| 2011/0283328 A1* | 11/2011 | Davis | H04N 21/4334 | 725/62 |
| 2011/0283329 A1* | 11/2011 | Davis | H04N 21/8126 | 725/62 |
| 2013/0052939 A1* | 2/2013 | Anniballi | H04H 60/56 | 455/3.01 |
| 2013/0167173 A1* | 6/2013 | Davis | H04N 21/4532 | 725/37 |
| 2013/0347016 A1* | 12/2013 | Rowe | H04N 21/25866 | 725/13 |
| 2014/0026158 A1* | 1/2014 | Rowe | H04N 21/42218 | 725/18 |
| 2014/0082651 A1* | 3/2014 | Sharifi | H04N 21/4668 | 725/20 |
| 2017/0337287 A1* | 11/2017 | Gill | G06Q 30/0611 | |

* cited by examiner

METHOD, SYSTEM, AND APPARATUS FOR PROGRAMMATICALLY GENERATING A CHANNEL INCREMENTALITY RATIO

CROSS-REFERENCE TO RELATED APPLICATIONS

The present application is a continuation of U.S. application Ser. No. 17/322,384, titled "METHOD, SYSTEM, AND APPARATUS FOR PROGRAMMATICALLY GENERATING A CHANNEL INCREMENTALITY RATIO," filed May 17, 2021, which is a continuation of U.S. application Ser. No. 16/892,979, titled "METHOD, SYSTEM, AND APPARATUS FOR PROGRAMMATICALLY GENERATING A CHANNEL INCREMENTALITY RATIO," filed Jun. 4, 2020, now U.S. Pat. No. 11,044,509 issued Jun. 22, 2021, which is a continuation of U.S. application Ser. No. 16/228,547, titled "METHOD, SYSTEM, AND APPARATUS FOR PROGRAMMATICALLY GENERATING A CHANNEL INCREMENTALITY RATIO," filed Dec. 20, 2018, now U.S. Pat. No. 10,715,855 issued Jul. 14, 2020, which claims priority to U.S. Provisional Application Ser. No. 62/608,381, titled "METHOD, SYSTEM, AND APPARATUS FOR PROGRAMMATICALLY GENERATING A CHANNEL INCREMENTALITY RATIO," filed Dec. 20, 2017, the contents of each of which are incorporated herein by reference in their entirety.

BACKGROUND

Assessing the efficiency of a channel for providing digital traffic is a complex computational challenge. Through applied effort, ingenuity, and innovation, many of these identified problems have been solved by developing solutions that are included in embodiments of the present disclosure, many examples of which are described in detail herein.

BRIEF SUMMARY

This specification relates to a method, system, and apparatus for programmatically generating a channel incrementality ratio using a machine learning model. In one embodiment, a computing entity or apparatus is configured to receive a plurality of touchpoint signals from a plurality of client devices, where each touchpoint signal of the plurality of touchpoint signals is associated with a respective channel of a plurality of channels, and each channel of the plurality of channels is associated with a unique channel identifier.

The apparatus is further configured to receive a plurality of transaction signals from the plurality of client devices, where each transaction signal of the plurality of transaction signals is associated with a respective channel of the plurality of channels.

The apparatus is further configured to extract a transaction timestamp from each transaction signal of the plurality of transaction signals into a plurality of transaction timestamps.

The apparatus is further configured to extract a touchpoint timestamp from each touchpoint signal of the plurality of touchpoint signals into a plurality of touchpoint timestamps.

The apparatus is further configured to generate a touchpoint timestamps subset comprising touchpoint timestamps of the plurality of touchpoint timestamps associated with a particular transaction timestamp of the plurality of transaction timestamps, where each touchpoint timestamp of the touchpoint timestamps subset was received within a period of network time prior to the particular transaction timestamp.

For each different channel of the plurality of channels associated with at least one touchpoint timestamp of the touchpoint timestamps subset, the apparatus is further configured to locate a latest channel landing-page touchpoint timestamp for a channel.

The apparatus is further configured to generate a sorted list using each channel identifier of the plurality of channels by using a time order associated with the latest channel landing-page touchpoint timestamp for each different channel associated with the touchpoint timestamps subset.

The apparatus is further configured to assign a weighting factor to each channel based on a location of a channel identifier associated with the channel in the sorted list.

The apparatus is further configured to generate a channel incrementality ratio associated with each channel using a machine learning model and based at least on the plurality of transaction timestamps, a plurality of touchpoint timestamps subsets, the sorted list, and the weighting factor for each channel.

In other embodiments, the apparatus is additionally configured to determine or adjust a channel currency allocation value for each channel based at least on its associated channel incrementality ratio.

Other embodiments include corresponding systems, methods, and computer programs, configured to perform the operations of the apparatus, encoded on computer storage devices.

Other embodiments can each optionally include a transaction timestamp, where the transaction timestamp indicates a transaction signal receiving time.

Other embodiments can each optionally include a touchpoint timestamp, where the touchpoint timestamp indicates a touchpoint signal receiving time.

Other embodiments can each optionally include a latest channel landing-page touchpoint timestamp for each different channel associated with the touchpoint timestamps subset, where each latest channel landing-page touchpoint timestamp indicates a latest touchpoint signal receiving time associated with each channel occurred immediately prior to a transaction signal receiving time associated with a particular touchpoint timestamps subset.

Other embodiments can each optionally include a period of network time. In one embodiment, the period of network time prior to the particular transaction timestamp is three days.

Other embodiments can each optionally include a weighting factor, where the weighting factor is a predetermined number associated with the location of the channel identifier in the sorted list.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
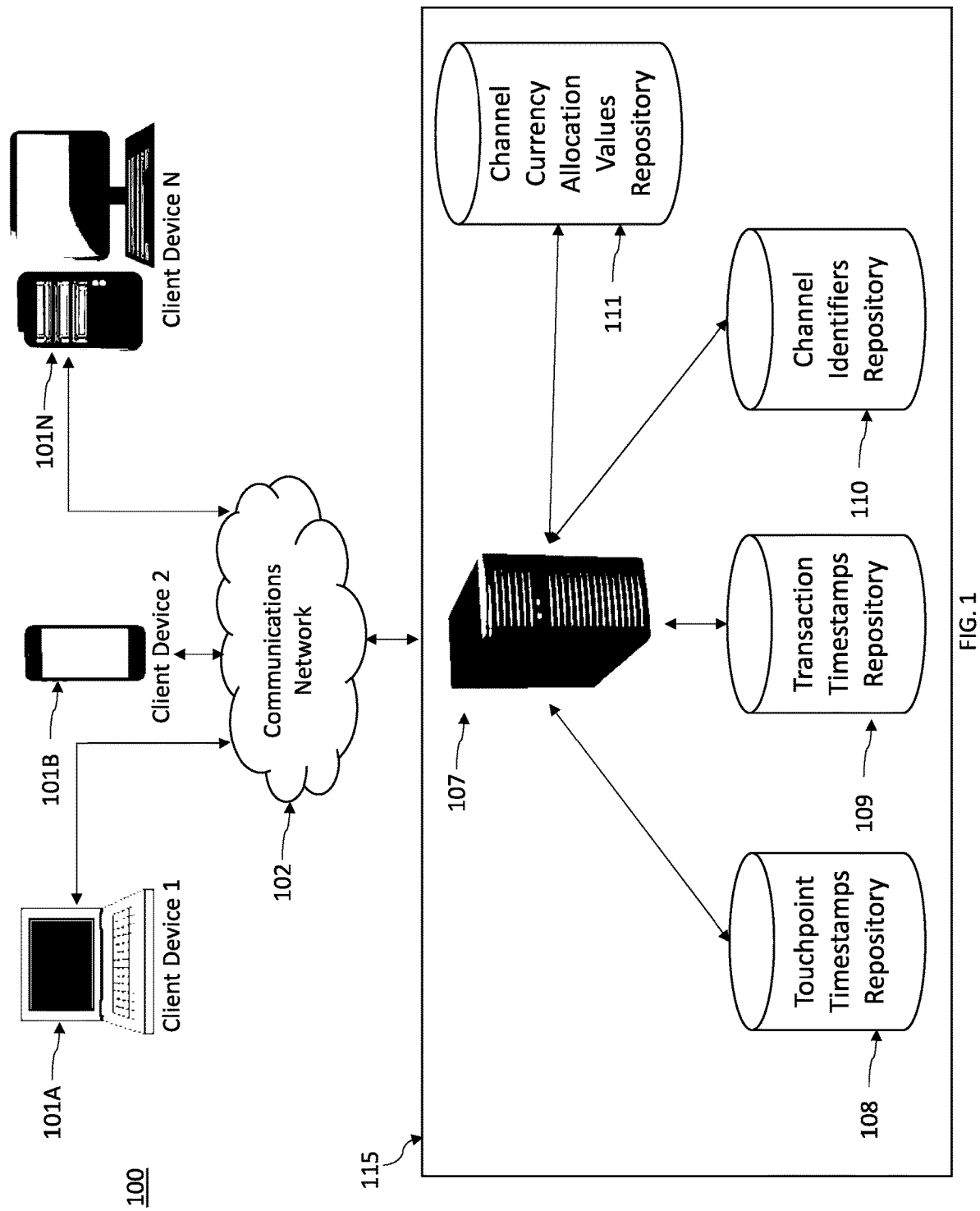
Figure 2:
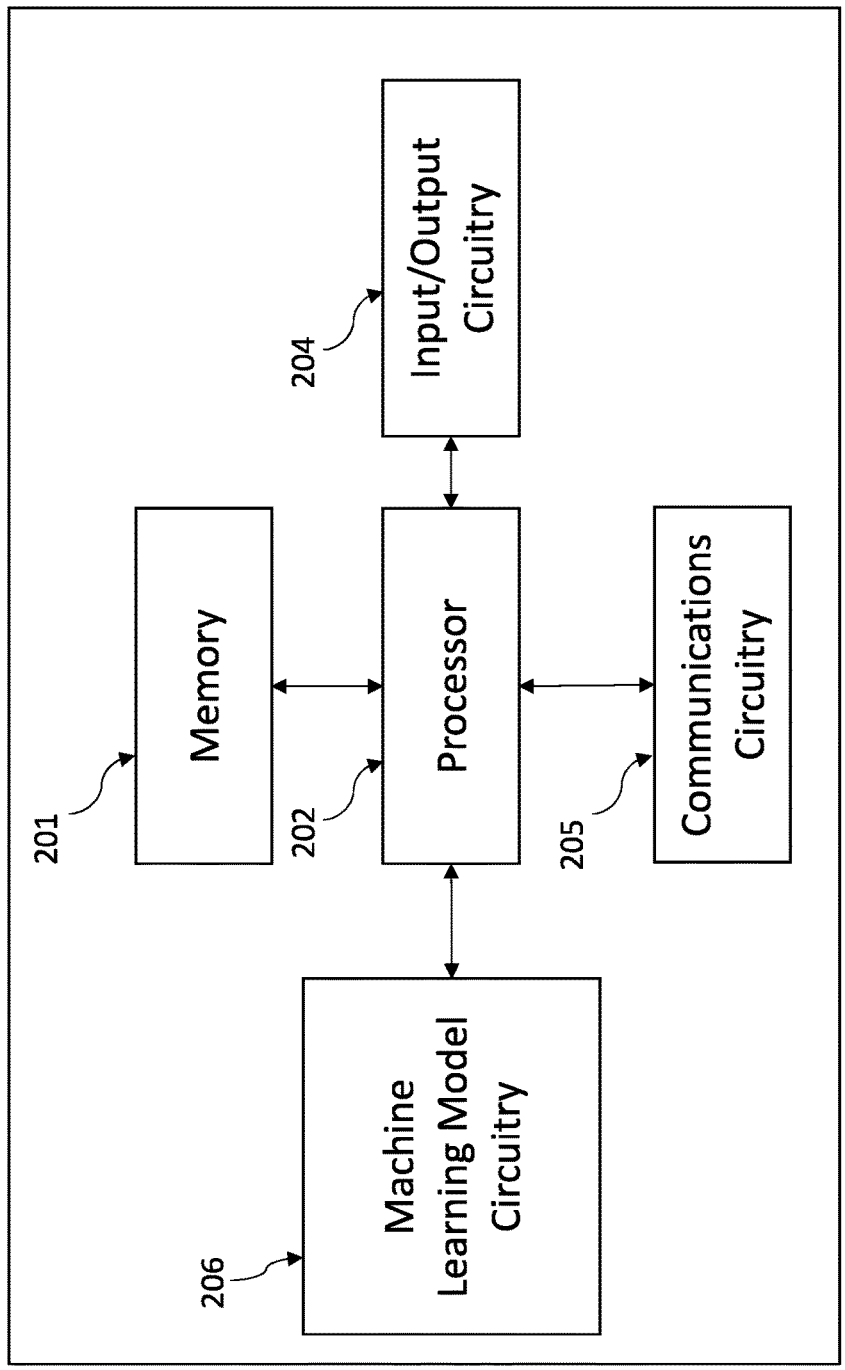
Figure 3:
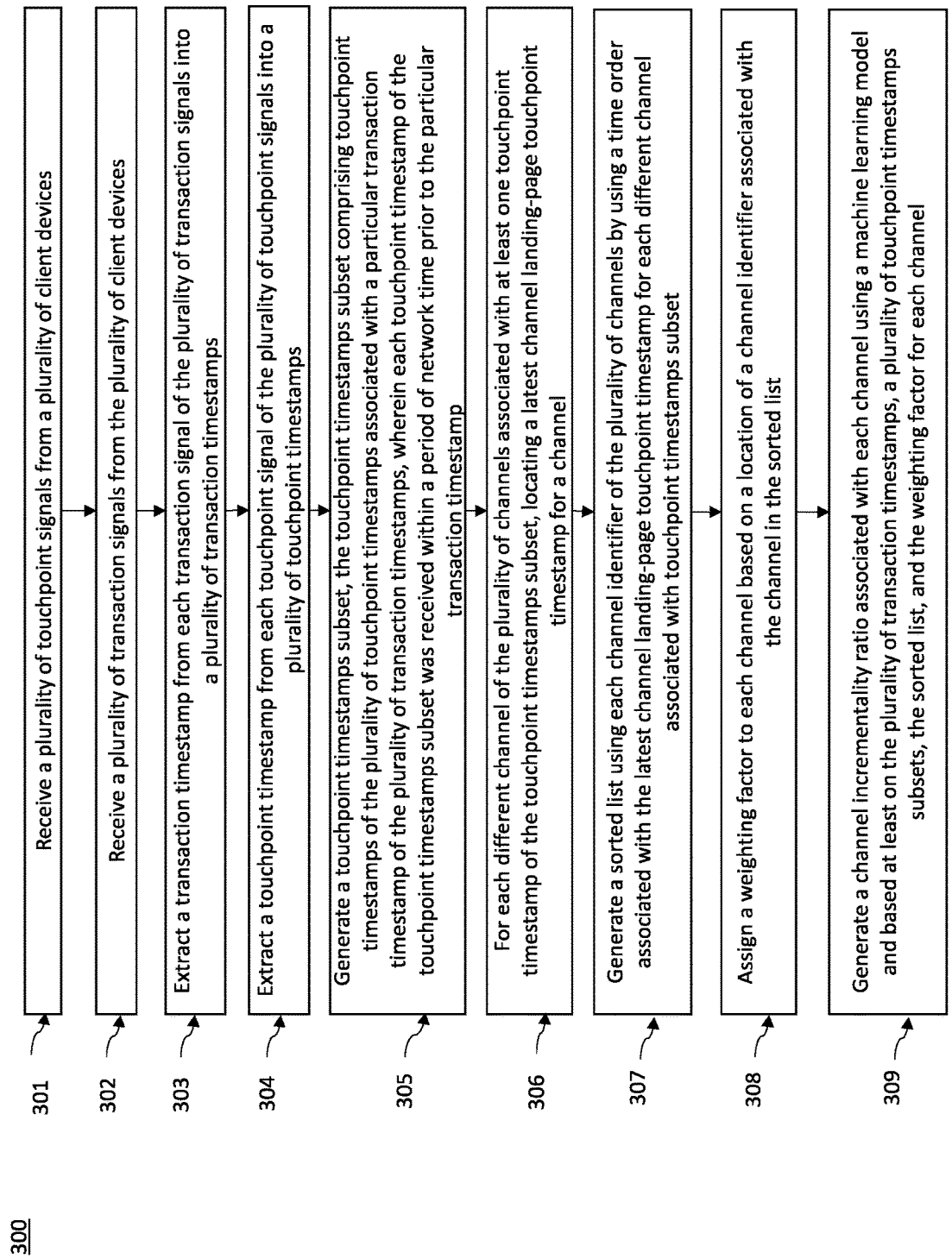
Figure 4:
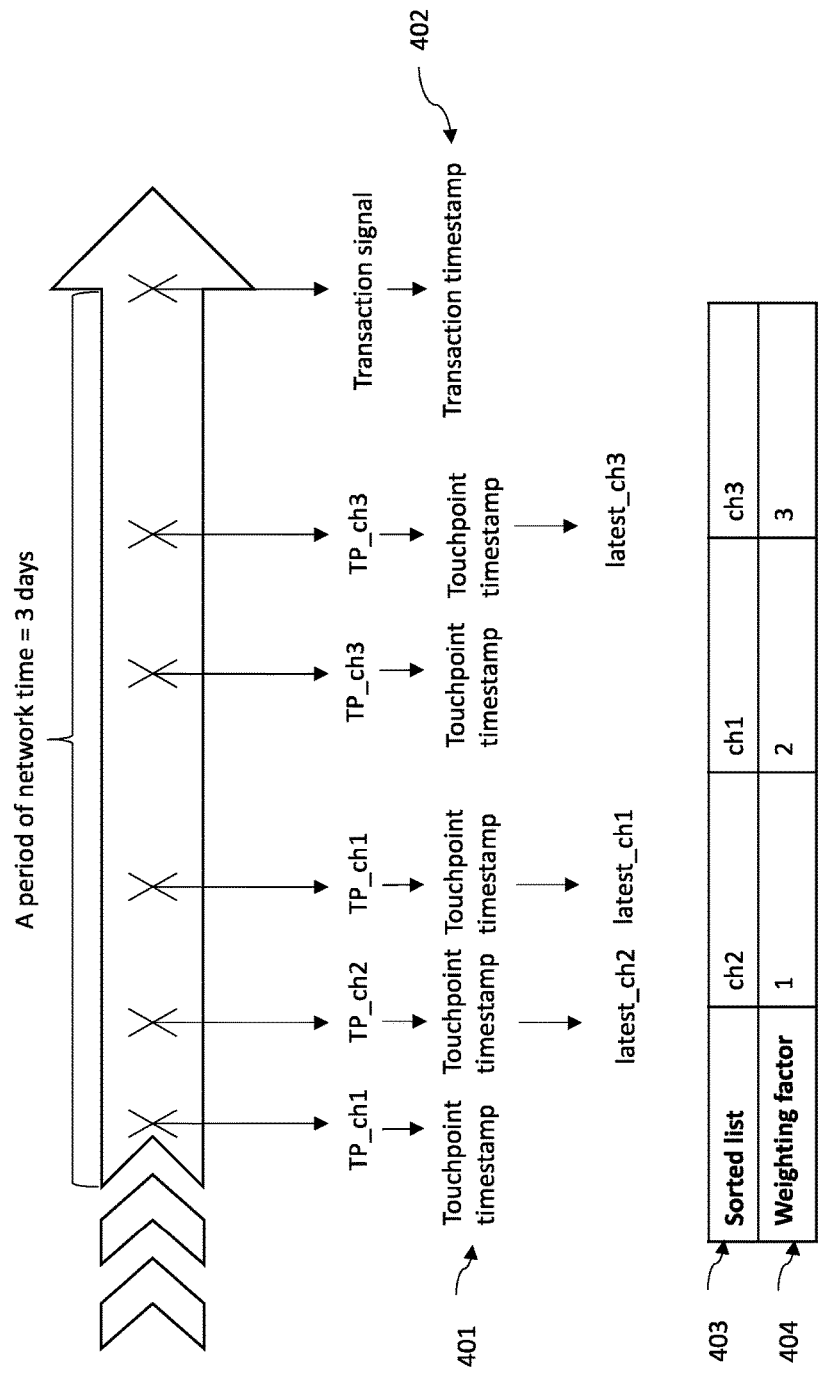

Having thus described the disclosure in general terms, reference will now be made to the accompanying drawings, which are not necessarily drawn to scale, and wherein:

FIG. 1 is an exemplary logical design diagram of a system configured to practice embodiments of the present disclosure;

FIG. 2 illustrates an exemplary schematic diagram of a computing entity according to one embodiment of the present disclosure;

FIG. 3 illustrates an exemplary process for generating a channel incrementality ratio according to one embodiment of the present disclosure; and FIG. 4 illustrates an exemplary embodiment for assigning a weighting factor to each channel based on a sorted list of channel identifiers according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to programmatically generating a channel incrementality ratio using a machine learning model.

Embodiments of the present disclosure resolve the issue of assessing the efficiency of a channel for providing digital traffic in the context of search advertising and display network advertising. A machine learning model is used to generate a channel incrementality ratio based on historical data including a plurality of transaction timestamps, a plurality of touchpoint timestamps subsets, a sorted list, and a weighting factor for each channel.

Furthermore, a channel incrementality ratio generated according to one embodiment of the present disclosure may be used to determine or adjust a channel currency allocation value associated with a channel.

Traditionally, the efficiency of a channel is assessed by performing online controlled incrementality testing (also known as AB testing). In online controlled incrementality testing, client devices are randomly split between the variants (i.e. the two different testing environments associated with a common device rendered object service, such as turning on a channel and turning off a channel for providing digital traffic to a common device rendered object service) in a short-term period. The client devices' interactions with the two different testing environments associated with the common device rendered object service are measured to determine the efficiency of the channel for routing digital traffic to the device rendered object service.

However, the online controlled incrementality testing may create several issues including waste of network resources, time dedicated to the testing, and reduced accuracy of the testing results. More specifically, online controlled incrementality testing has to be performed for each channel associated with a common device rendered object service, which may waste network resources and time by performing testing separately for each channel. Furthermore, performing online controlled incrementality testing for a relatively short-term period to determine the efficiency of a channel in a long-term period may not be accurate.

The inventors have determined that the ability to assess the efficiency of a channel offline using historical data based on a machine learning model would reduce the waste of network resources and time necessary to perform incrementality testing as well as improve a programmatic understanding of channel efficiency. Furthermore, using the historical data and the machine learning model may have a better predictive result in comparison to online controlled incrementality testing.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In the present embodiments, device rendered objects may have associated therewith one or more attributes. It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, and Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, and else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

A machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine learning model is a linear model.

The term "device rendered object interaction" refers to electronic interactions with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data (e.g., device rendered object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "device rendered object interaction signal" refers to electronic indication that an interaction as defined above has occurred with respect to a particular device rendered object.

It should be appreciated that the term "programmatically expected" indicates machine prediction of occurrence of certain events.

As used herein, the term "likelihood" refers to a measure of probability for occurrence of a particular event. For example, the likelihood that a client device will interact with a device rendered object may be a value associated with a specific scale. In some implementations, the machine predictions discussed above and below are based, at least in part, on the "likelihood" that an event will occur. Similarly, in some implementations, machine predictions are based on attributes associated with a client profile and/or an associated device rendered object.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

As used herein, the term "channel" refers to a digital traffic source that may electronically provide or route digital traffic to a device rendered object service. For example, a channel may be a direct traffic source that routes digital traffic to a device rendered object service through clicks of a user via a client device on a bookmark associated with the device rendered object service's website, a search engine that sends digital traffic to a device rendered object service through clicks of a user via a client device on a search engine results interface displayed on a graphical user interface of the client device, or a Urchin Tracking Module (UTM) campaign (e.g. Ebates, Criteo, Facebook, and the like) that sends digital traffic to a device rendered object service through clicks of a user via a client device on an advertisement associated with the device rendered object service and displayed on a graphical user interface of the client device.

As used herein, the term "channel identifier" refers to one or more items of data by which a channel may be uniquely identified. For example, a channel identifier may comprise ASCII text, a pointer, a memory address, and the like.

As used herein, the term "channel incrementality ratio" refers to a value programmatically generated by a server for assessing efficiency of a channel used for routing digital traffic to a device rendered object service. In embodiments, a channel incrementality ratio represents a probability that a device rendered object interaction would have occurred had a particular channel been disabled.

As used herein, the term "transaction signal" refers to an electronic signal received by a server from a client device that is associated with a user profile, where the transaction signal indicates the client device associated with the user profile has completed a transaction with a device rendered object. The transaction signal may include information associated with the user profile that completed a transaction via the client device.

As used herein, the term "touchpoint signal" refers to an electronic signal received by a server from a client device that is associated with a user profile, where the touchpoint signal indicates the client device associated with the user profile has completed an electronic interaction with a device rendered object. The touchpoint signal may include information associated with the user profile that completed an electronic interaction via the client device.

As used herein, the term "timestamp" refers to one or more items of data including an electronic record of the network time of occurrence of a particular event. As used herein, the term "transaction timestamp" refers to an electronic record of a transaction time when a client device associated with a user profile has completed a transaction with a device rendered object. As used herein, the term "touchpoint timestamp" refers to an electronic record of a touchpoint time when a client device associated with a user profile has completed an electronic interaction with a device rendered object prior to any transactions occurred between the client device and the device rendered object.

As used herein, the term "touchpoint timestamps subset" refers to one or more items of data including a subset of a plurality of touchpoint timestamps defined above.

As used herein, the term "transaction signal receiving time" refers to an electronic record of time when a server receives a transaction signal from a client device that is associated with a user profile, where the transaction signal is defined above.

As used herein, the term "touchpoint signal receiving time" refers to an electronic record of time when a server receives a touchpoint signal from a client device that is associated with a user profile, where the touchpoint signal is defined above.

As used herein, the term "latest channel landing-page touchpoint timestamp" refers to an electronic record of time occurred immediately prior to any transactions completed between a client device and a device rendered object representing the client device's latest electronic interaction with the device rendered object.

As used herein, the term "latest channel landing-page touchpoint signal receiving time" refers to an electronic record of time when a server receives a touchpoint signal from a client device that is associated with a user profile, where the touchpoint signal is defined above and received immediately prior to any transactions completed between the client device and a device rendered object representing the client device's latest electronic interaction with the device rendered object.

As used herein, "by using a time order" refers to a sorted order of latest channel landing-page touchpoint timestamps associated with each different channel associated with a unique channel identifier, where the latest channel landing-page touchpoint timestamp for each different channel may be sorted based on an increasing of electronic record of time associated with those latest channel landing-page touchpoint timestamps.

As used herein, "a sorted list" refers to a list generated using different channel identifiers by using a time order (defined above). In embodiments, each channel identifier is associated with a unique channel.

As used herein, the term "weighting factor" refers to a value programmatically generated by a server based on a location of a channel identifier associated with a channel in a sorted list for determining a channel currency allocation value (defined below) for the channel providing digital traffic to a device rendered object.

As used herein, the term "channel currency allocation value" refers to a digital representation of an amount of currency a device rendered object service is willing to have deducted from a currency account associated with a channel in return for the channel directing digital traffic to the device rendered object service.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Example System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present invention may operate. Client devices may access a device rendered object system 115 via a communications network 102 (e.g., the Internet, LAN, WAN, or the like) using client devices 101A-101N. The device rendered object system 115 may comprise a server 107 in communication with one or more databases or repositories 108, 109, 110, 111.

The server 107 may be embodied as a computer or computers as known in the art. The server 107 may be provided for receiving of electronic data from various sources, including but not necessarily limited to the client devices 101A-101N. For example, the server 107 may be operable to receive transaction signals or touchpoint signals transmitted by the client devices 101A-101N. The server 107 may facilitate the generation and providing of various search results comprising digital content objects.

The databases or repositories 108-111 may be embodied as a data storage device such as a Network Attached Storage (NAS) device or devices, or as a separate database server or servers. The databases 108-111 include information accessed and stored by the server 107 to facilitate the operations of the device rendered object system 115. For example, the databases 108-111 may include, without limitation, client profiles for users of the system 115, a plurality of touchpoint timestamps, a plurality of transaction timestamps, a plurality of channel identifiers, a plurality of channel currency allocation values associated with each different channel, and/or the like.

Channel currency allocation values repository 111 may include a plurality of channel currency allocation values associated with each different channel.

Channel identifiers repository 110 may include a plurality of channel identifiers, where each channel identifier is associated with a unique channel.

Transaction timestamps repository 109 may include a plurality of transaction timestamps, where each transaction timestamp refers to an electronic record of a transaction time when a client device associated with a user profile has completed a transaction with a device rendered object.

Touchpoint timestamps repository 108 may include a plurality of touchpoint timestamps, where each touchpoint timestamp refers to an electronic record of a touchpoint time when a client device associated with a user profile has completed an electronic interaction with a device rendered object prior to any transactions occurred between the client device and the device rendered object.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 via a web browser. As yet another example, the client device 101A-101N may include various hardware or firmware designed to interface with the system 115.

It will be appreciated that repositories 108-111 may be one or more repositories, and may be part of or separate from server 107.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, and machine learning model circuitry 206. The apparatus 200 may be configured to execute the operations described herein. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Machine learning model circuitry 206 includes hardware configured to generate a channel incrementality ratio of a channel. The machine learning model circuitry may utilize processing circuitry, such as the processor 202, to perform these actions. However, it should also be appreciated that, in some embodiments, the machine learning model circuitry may include a separate processor, specially configured field programmable gate array (FPGA), or application specific interface circuit (ASIC) for performing the functions described herein. Circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 illustrates an exemplary process for generating a channel incrementality ratio according to one embodiment of the present disclosure.

The method 300 begins with receiving a plurality of touchpoint signals from a plurality of client devices 301. In the exemplary process, each touchpoint signal of the plurality of touchpoint signals is associated with a respective channel of a plurality of channels, where each channel of the plurality of channels is associated with a unique channel identifier.

The method 300 continues with receiving a plurality of transaction signals from the plurality of client devices 302. In the exemplary process, each transaction signal of the plurality of transaction signals is associated with a respective channel of the plurality of channels.

The method 300 continues with extracting a transaction timestamp from each transaction signal of the plurality of transaction signals into a plurality of transaction timestamps 303. In one embodiment, the transaction timestamp may indicate a transaction signal receiving time.

The method 300 continues with extracting a touchpoint timestamp from each touchpoint signal of the plurality of touchpoint signals into a plurality of touchpoint timestamps 304. In one embodiment, the touchpoint timestamp may indicate a touchpoint signal receiving time.

The method 300 continues with generating a touchpoint timestamps subset comprising touchpoint timestamps of the plurality of touchpoint timestamps associated with a particular transaction timestamp of the plurality of transaction timestamps 305. In one embodiment, each touchpoint timestamp of the touchpoint timestamps subset was received within a period of network time prior to the particular transaction timestamp. In such an embodiment, the period of network time prior to the particular transaction timestamp may be three days.

For each different channel of the plurality of channels associated with at least one touchpoint timestamp of the touchpoint timestamps subset, the method 300 continues with locating a latest channel landing-page touchpoint timestamp for a channel 306. In one embodiment, each latest channel landing-page touchpoint timestamp may indicate a latest touchpoint signal receiving time associated with each different channel occurred immediately prior to a transaction signal receiving time associated with a particular touchpoint timestamps subset.

The method 300 continues with generating a sorted list using each channel identifier of the plurality of channels by using a time order associated with the latest channel landing-page touchpoint timestamp for each different channel associated with the touchpoint timestamps subset 307.

The method 300 continues with assigning a weighting factor to each channel based on a location of a channel identifier associated with the channel in the sorted list 308.

In one embodiment, the weighting factor is a predetermined number associated with the location of the channel identifier in the sorted list.

The method 300 finally continues with generating a channel incrementality ratio associated with each channel using a machine learning model and based at least on the plurality of transaction timestamps, a plurality of touchpoint timestamps subsets, the sorted list, and the weighting factor for each channel 309.

In embodiments, a channel currency allocation value is determined based at least on a channel incrementality ratio generated in method 300.

FIG. 4 illustrates an exemplary embodiment 400 for assigning a weighting factor to each channel based on a sorted list of channel identifiers according to one embodiment of the present disclosure. In such an embodiment, a touchpoint timestamps subset 401 comprising touchpoint timestamps associated with a particular transaction timestamp 402 is generated. The touchpoint timestamps subset 401 is generated based on the touchpoint timestamps received within a period of network time prior to the particular transaction timestamp 402, where each touchpoint timestamp of the touchpoint timestamps subset is associated with a respective channel of the plurality of channels. In such an embodiment, the period of network time may be three days. Moreover, a sorted list of different channel identifiers 403 may be generated by using a time order based on locating a latest channel landing-page touchpoint timestamp for each different channel within the touchpoint timestamps subset. In such an embodiment, a weighting factor 404 may be assigned to each channel based on a location of a channel identifier associated with the channel in the sorted list. In the exemplary embodiment 400, a weighting factor of value 1 is assigned to channel 2, since the channel identifier of channel 2 is located at the first in order within the sorted list. A weighting factor of value 2 is assigned to channel 1, since the channel identifier of channel 1 is located at the second in order within the sorted list. Similarly, a weighting factor of value 3 is assigned to channel 3, since the channel identifier of channel 3 is located at the third in order within the sorted list.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer program product comprising at least one non-transitory computer-readable storage medium having computer-executable program code instructions stored therein, the computer-executable program code instructions comprising program code instructions to:
  generate, based at least in part on a latest channel landing-page touchpoint timestamp associated with each channel of a plurality of channels, an ordered list for the plurality of channels, wherein the plurality of channels is associated with a touchpoint timestamps subset, wherein the touchpoint timestamps subset is associated with a first transaction timestamp of a plurality of transaction timestamps; and
  generate, utilizing a machine learning model and based at least in part on the ordered list, a channel incrementality ratio associated with each channel.

2. The computer program product of claim 1, wherein the ordered list comprises a plurality of channel identifiers, wherein each channel identifier is associated with a particular channel of the plurality of channels and is associated with a location in the ordered list according to the latest channel landing-page touchpoint timestamp associated with the corresponding particular channel.

3. The computer program product of claim 2, wherein the computer-executable program code instructions further comprise program code instructions to:
  assign a weighting factor to each channel based at least in part on the location of the channel identifier associated with the channel in the ordered list.

4. The computer program product of claim 3, wherein generating, utilizing the machine learning model, the channel incrementality ratio associated with each channel is further based at least in part on the weighting factor assigned to the respective channel.

5. The computer program product of claim 1, wherein generating, utilizing the machine learning model, the channel incrementality ratio associated with each channel is further based at least in part on the plurality of transaction timestamps.

6. The computer program product of claim 1, wherein the touchpoint timestamps subset comprises one or more touchpoint timestamps received within a period of network time prior to the first transaction timestamp.

7. The computer program product of claim 6, wherein the latest channel landing-page touchpoint timestamp for each channel represents a latest touchpoint signal receiving time associated with the channel that occurred within the period of network time prior to the first transaction timestamp.

8. The computer program product of claim 1, wherein the first transaction timestamp is associated with a transaction signal of a plurality of transaction signals received from a plurality of client devices.

9. The computer program product of claim 1, wherein the computer-executable program code instructions further comprise program code instructions to:
 determine or adjust a channel currency allocation value associated with each channel based at least in part on its associated channel incrementality ratio.

10. An apparatus comprising at least one processor and at least one memory storing instructions that, with the at least one processor, configure the apparatus to:
 generate, based at least in part on a latest channel landing-page touchpoint timestamp associated with each channel of a plurality of channels, an ordered list for the plurality of channels, wherein the plurality of channels is associated with a touchpoint timestamps subset, wherein the touchpoint timestamps subset is associated with a first transaction timestamp of a plurality of transaction timestamps; and
 generate, utilizing a machine learning model and based at least in part on the ordered list, a channel incrementality ratio associated with each channel.

11. The apparatus of claim 10, wherein the ordered list comprises a plurality of channel identifiers, wherein each channel identifier is associated with a particular channel of the plurality of channels and is associated with a location in the ordered list according to the latest channel landing-page touchpoint timestamp associated with the corresponding particular channel.

12. The apparatus of claim 11, wherein the at least one memory stores instructions that, with the at least one processor, further configure the apparatus to:
 assign a weighting factor to each channel based at least in part on the location of the channel identifier associated with the channel in the ordered list.

13. The apparatus of claim 12, wherein:
 generating, utilizing the machine learning model, the channel incrementality ratio associated with each channel is further based at least in part on the weighting factor assigned to the respective channel.

14. The apparatus of claim 10, wherein:
 generating, utilizing the machine learning model, the channel incrementality ratio associated with each channel is further based at least in part on the plurality of transaction timestamps.

15. The apparatus of claim 10, wherein the touchpoint timestamps subset comprises one or more touchpoint timestamps received within a period of network time prior to the first transaction timestamp.

16. The apparatus of claim 15, wherein the latest channel landing-page touchpoint timestamp for each channel represents a latest touchpoint signal receiving time associated with the channel that occurred within the period of network time prior to the first transaction timestamp.

17. The apparatus of claim 10, wherein the first transaction timestamp is associated with a transaction signal of a plurality of transaction signals received from a plurality of client devices.

18. The apparatus of claim 10, wherein the at least one memory stores instructions that, with the at least one processor, further configure the apparatus to:
 determine or adjust a channel currency allocation value associated with each channel based at least in part on its associated channel incrementality ratio.

19. A computer-implemented method, comprising:
 generating, based at least in part on a latest channel landing-page touchpoint timestamp associated with each channel of a plurality of channels, an ordered list for the plurality of channels, wherein the plurality of channels is associated with a touchpoint timestamps subset, wherein the touchpoint timestamps subset is associated with a first transaction timestamp of a plurality of transaction timestamps; and
 generating, utilizing a machine learning model and based at least in part on the ordered list, a channel incrementality ratio associated with each channel.

20. The computer-implemented method of claim 19, wherein the ordered list comprises a plurality of channel identifiers, wherein each channel identifier is associated with a particular channel of the plurality of channels and is associated with a location in the ordered list according to the latest channel landing-page touchpoint timestamp associated with the corresponding particular channel.

* * * * *